Sept. 8, 1959  R. E. GRANTHAM ET AL  2,903,653
BROAD-BAND HYBRID JUNCTION
Filed Feb. 9, 1955  5 Sheets-Sheet 1

INVENTORS
R. E. GRANTHAM
J. W. DORSETT JR.

BY
ATTORNEYS

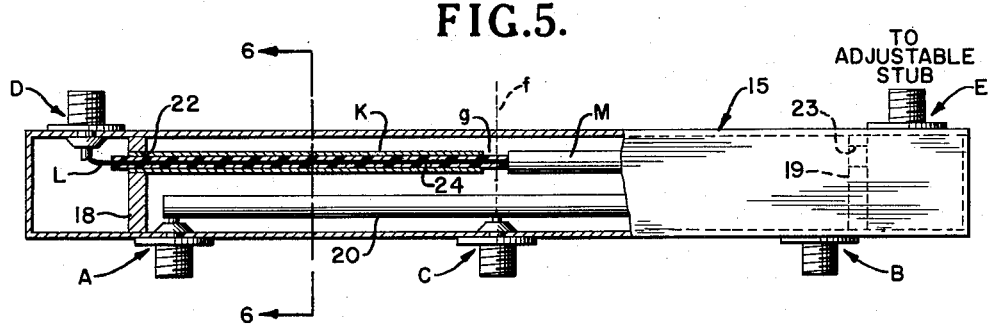
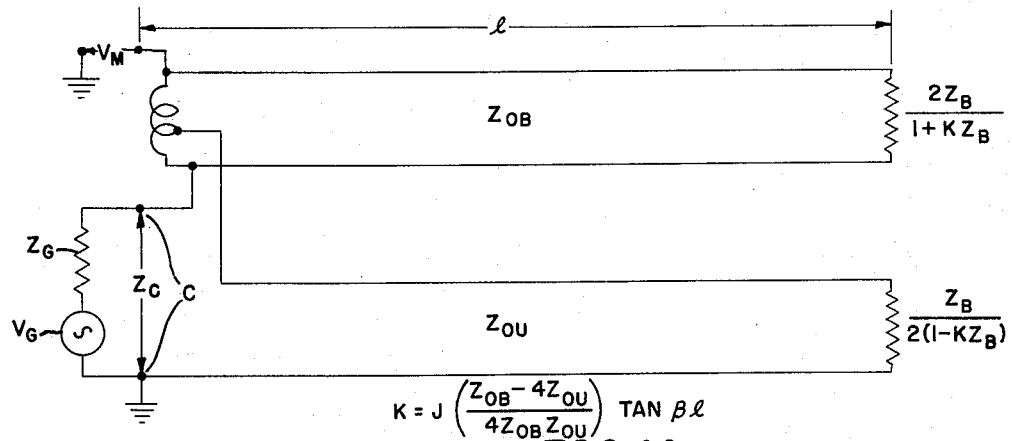
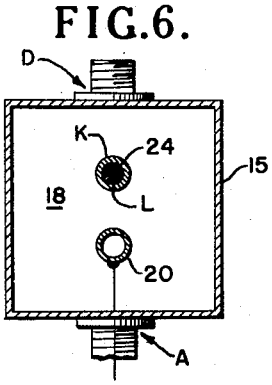
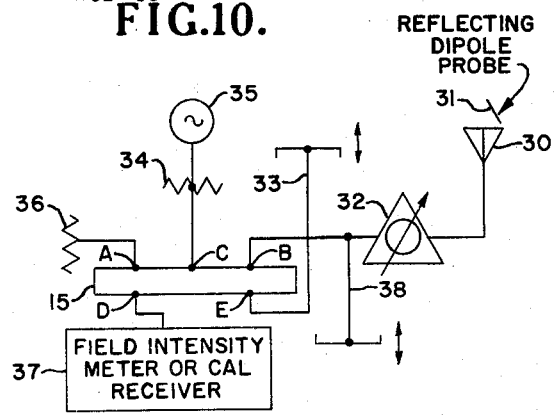

--------- TERMINAL C

——————— TERMINALS A and B (ADJUSTABLE SHORT)

— — — — TERMINALS A and B (FIXED SHORT)

INVENTORS
R. E. GRANTHAM
J. W. DORSETT JR.

Sept. 8, 1959     R. E. GRANTHAM ET AL     2,903,653
BROAD-BAND HYBRID JUNCTION
Filed Feb. 9, 1955                                       5 Sheets-Sheet 5

INVENTORS
R. E. GRANTHAM
J. W. DORSETT JR.

BY

ATTORNEYS

United States Patent Office 2,903,653
Patented Sept. 8, 1959

2,903,653

BROAD-BAND HYBRID JUNCTION

Rodney E. Grantham, Bethesda, Md., and James W. Dorsett, Jr., Menlo Park, Calif., assignors to the United States of America as represented by the Secretary of the Navy Application February 9, 1955, Serial No. 487,228

7 Claims. (Cl. 333—11)

(Granted under Title 35, U.S. Code (1952), sec. 266)

The invention described herein may be manufactured and used by or for the Government of the United States of America for governmental purposes without the payment of any royalties thereon or therefor.

The present invention relates to coupling arrangements for wave transmission systems and more particularly to a hybrid junction wherein the hybrid property is obtained by means of the mechanical configuration rather than by means of electrical lengths of lines as is the practice in the usual hybrid ring.

The conventional hybrid junction or magic T is a four-terminal pair network having properties necessary for the operation of many well known circuits and measurement methods, and its use at microwave frequencies has been widespread because wide-band designs are available. Heretofore, at VHF and UHF, where coaxial transmission lines are utilized, the hybrid junction has received limited application primarily because only narrow-band types have been available, the hybrid ring being the narrow-band design most commonly used. More recently the usual hybrid ring design has been modified to obtain operation over a broader frequency range. However, although the recently modified version of the hybrid ring has an improved frequency range, the frequency range is not as extensive as is desired, and, furthermore, difficulties are encountered in applying the aforementioned improved hybrid ring to unbalanced lines.

The present invention provides a new and improved hybrid junction design which has a frequency range more extensive than heretofore obtained and which avoids the difficulties encountered in applications to unbalanced lines. The new design disclosed herein has properties similar to those of the E–H Tee, sometimes loosely called a magic T, constructed from rectangular waveguides. Although the new junction described herein is not matched, it retains isolation between the E and H plane terminal pairs over a frequency range which exceeds the measured range of 100 to 1000 mc., and the magnitudes of its scattering coefficients are such as to permit reasonably efficient operation in most of the practical circuit applications. Of course, by adding two transformers, the junction can be made to have all of the properties of a matched magic T, within frequency limitations imposed by the transformers.

In accordance with the invention, there is provided a closed rectangular waveguide having an aperture in each end thereof and a pair of axially aligned coaxial lines having a common inner conductor, the lines being longitudinally coextensive with the waveguide and having the outer conductors connected to the waveguide at the apertures thereof and the inner conductor extending centrally therethrough. Disposed on one face of the waveguide are three pairs of equally spaced terminals, each terminal pair consisting of a coaxial connector having the outer conductor connected to the waveguide and the inner conductor protruding into the waveguide wherein the inner conductors of the aforesaid three pairs of terminals are connected together by means of a conductor which is so disposed within the waveguide as to be electromagnetically coupled with the pair of coaxial lines. Although not necessary, there is provided at one pair of the guide end terminals a shorting stub for selectively adjusting the length of one of the pair of coaxial lines, thereby enabling tuning of the junction to effectively improve the transmission characteristics thereof.

An object of the present invention is the provision of a new and improved hybrid junction having a broader band-width than has heretofore been obtained by previous hybrid junctions.

Another object is to provide a hybrid junction having increased band-width and little difficulty in application to unbalanced lines.

A further object of the invention is the provision of a new and improved hybrid junction wherein the hybrid property is obtained from mechanical configuration rather than by electrical line lengths.

A primary object of the invention is the provision of a hybrid junction consisting of a pair of axially aligned coaxial lines electromagnetically coupled to a conductive tube which has three pairs of terminals connected thereto, the coaxial lines and conductive tube being enclosed within a cylindrical waveguide which acts as a shield.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 4 is an equivalent circuit of the half junction illustrated in Fig. 3;

Fig. 5 is a side view, partly in section, of the mechanical construction of the invention;

Fig. 6 is a sectional view of the invention taken along line 6—6 of Fig. 5;

Figs. 10, 11, 12 and 13 illustrate schematic diagrams of circuits utilizing the hybrid junction of the invention.

Figure 1:
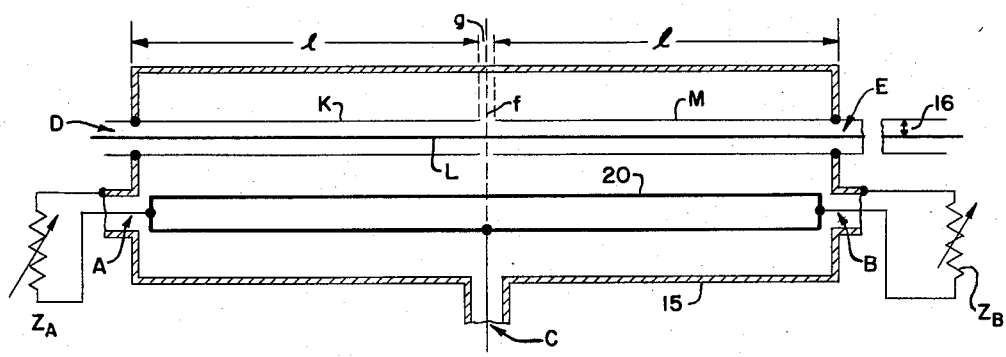
Fig. 1 illustrates schematically a diagram of the junction of the present invention.

Referring now to the drawings, wherein like reference characters designate like or corresponding parts throughout the several views, there is shown in Fig. 1, which illustrates a schematic representation of the junction of the invention, a rectangular waveguide 15 having five pairs of terminals shown generally at A, B, C, D and E, each pair of terminals having an inner conductor terminal and an outer concentric conductor terminal, the outer conductor terminal being formed by the waveguide wall circumferentially bounding the aperture in the waveguide through which the inner conductor terminal passes. The inner conductor of terminal pair C is connected directly to the inner conductors of terminal pairs A and B by means of a conductor 20. Terminal D is connected to terminal pair E by a pair of coaxial lines having a common inner conductor L and concentric outer conductors K and M which are equidistantly spaced from the center $f$ of the guide 15 and axially spaced by a gap $g$. One coaxial line is defined by inner conductor L and outer conductor K, and the other coaxial line is formed by inner conductor L and outer conductor M, the two coaxial lines being equal in length as shown by the dimension $l$. Terminal pair D is coupled to terminal pairs A, B and C by conductors K and M which are connected similarly to form a shielded loop with the shield broken at an intermediate point $f$ opposite terminal pair C. One-half of the loop is mutually coupled to the line between terminal pairs C and A and the other half is mutually coupled, with a shift in phase of 180°, to the line between terminal pairs C and B. The shift in phase of 180° derived in this manner does not vary with frequency. A shorting stub 16 is connected to conductors L and M at terminal E for tuning purposes. Terminal pairs A and B are adaptable to have adjustable impedances $Z_A$ and $Z_B$, respectively, connected thereto.

The hybrid properties are derived from the mechanical configuration and do not depend on electrical line lengths as in a hybrid ring. All of the terminals connect to unbalanced lines. It is possible to fold the unit back on itself at terminal pair C to halve the length and yet retain symmetry. The basic hybrid property of the junction does not depend on the type of cross section as long as symmetry is maintained and as long as transmission modes other than the TEM mode are suppressed. It is to be understood that, although a rectangular waveguide is illustrated and disclosed, the invention is not limited to rectangular or square guides, since the invention could be effectively utilized with a circular waveguide. The selection of cross-sectional dimensions and configurations will, however, affect the electrical characteristics. Although a shorting stub is shown and preferably utilized, the shorting is not essential in achieving the basic hybrid junction property of isolation between terminals C and D, and a fixed short or even an open ended line would work. However, the transmission coefficient between terminal D and A or between D and B is improved by tuning, as discussed later.

Figure 2:
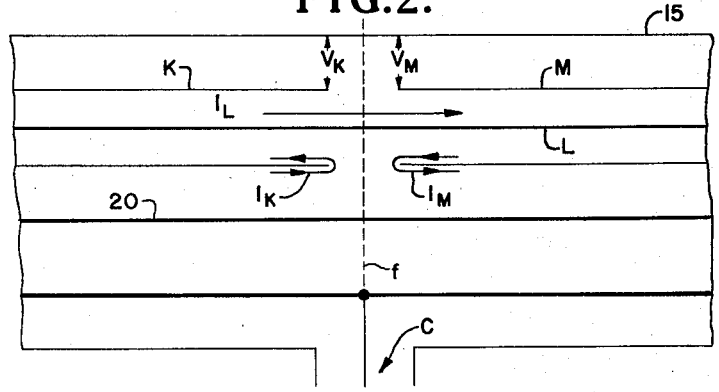
Fig. 2 is an exploded section around terminal pair C.

In operation, the property of zero direct coupling between terminal pairs C and D may be understood by the following analysis. If a generator is connected to terminal pair C, a receiver to terminal pair E and adjustable impedances on terminal pairs A and B, as denoted generally by reference characters $Z_A$ and $Z_B$, the current from terminal pair C to terminal pair B will induce a voltage $V_M$, shown in Fig. 2, between the outside of conductor M and the guide shield 15. Also, the current from C to A will induce a voltage $V_K$ between conductor K and the guide shield 15. If $Z_A = Z_B$, then by symmetry $I_K = I_M$ and $V_K = V_M$, and no voltage will appear at terminal pair D. Of course, if $V_K \neq V_M$, then $I_K \neq I_M$ and a voltage proportional to $V_K - V_M$ will appear at terminal pair D.

If a generator of voltage $V_D$ is connected to terminal pair D, then currents $I_K$ and $I_M$ will be induced and these currents will in turn induce voltages at terminal pairs A and B of opposite polarity, and, if $Z_A = Z_B$, then no voltage will appear at C. If, at the same time, a generator of voltage $V_C$ is connected to terminal pair C, voltages of equal polarity will result at terminals A and B, and, if $Z_A = Z_B$, no voltage will appear at D due to the generator at C. Thus, with generators at C and D and equal loads on A and B, the voltage at A will be proportional to $V_C + V_D$ and the voltage at B will be proportional to $V_C - V_D$.

By similar analysis, if generators of equal internal impedances and of voltages $V_A$ and $V_B$ are connected respectively to terminals A and B, then the voltage at D is proportional to $V_A - V_B$ and the voltage at C is proportional to $V_A + V_B$.

A junction built as described above will not ordinarily be matched. Theoretically, however, regardless of cross-section shape or dimension, the junction can be matched by adding two impedance transformers, one in series with terminal pair C and one in series with terminal pair D. With matched loads on A and B, the transformers are adjusted to produce a match at C and D. Then the junction has all of the magic properties of the matched magic T. The important added property, besides matched inputs, is isolation between A and B. If a generator is connected at A and matched loads at C and D, no voltage will appear at B and the power from the generator at A will be split equally between terminal pairs C and D.

The practical design of the junction was obtained by empirical methods, two equations being derived in a partial analysis to yield design information with expressions being obtained for the input impedance at terminal pair C and the voltage $V_M$, both with identical loads at A and B.

In the analysis, two TEM modes of propagation must be taken into account, one being the balanced mode in which the two inner conductors carry equal voltages of opposite polarity in push-pull fashion and the other being an unbalanced mode with the inner conductors carrying equal voltages of the same polarity in push-push fashion. In the unbalanced mode, the shield carries the oppositely polarized voltages as in the usual coaxial line.

Figure 3:
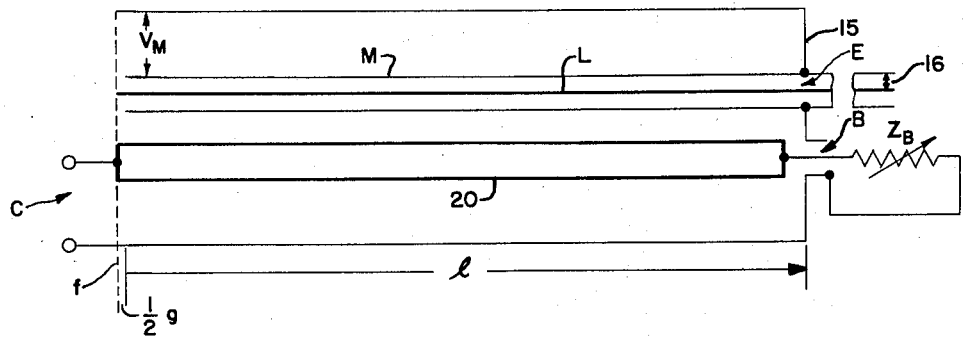
Fig. 3 illustrates half of the junction with a break at terminal pair C.

To obtain the input impedance at terminal C, reference is now made to Fig. 3 wherein is shown one-half of the junction. If a generator should be connected at terminal C, there is a tendency for both the balanced and unbalanced modes to be excited in the waveguide. Assuming the condition that the sum of voltages for the two modes must be zero at the right end of conductor M of Fig. 3, the equivalent circuit shown in Fig. 4 is derived. It then follows that the impedance $Z_C$ looking into terminal C is:

(1)
$$Z_C = \frac{Z_{OB}}{4}\left\{\frac{16 Z_{OU} Z_B + [4Z_{OU}(Z_{OB}-4Z_{OU}) + Z_B(4Z_{OU}-Z_B)]\tan^2\beta l}{H} + j\frac{4Z_{OU}(4Z_{OU}+Z_{OB})\tan\beta l}{H}\right\}$$

and the voltage $V_M$ is (2)
$$V_M = \frac{V_G Z_{OB} \tan \beta l}{4(Z_G + Z_C)}\left\{\frac{[4Z_{OU}(Z_{OB}-4Z_{OU}) - Z_B(Z_B-4Z_{OU})]\tan\beta l}{H} + j\frac{4Z_{OU}(4Z_{OU}-Z_{OB})}{H}\right\}$$

where $$H = 4Z_{OB}Z_{OU} + jZ_B(Z_{OB}+4Z_{OU})\tan\beta l$$

Here $Z_{OB}$ and $Z_{OU}$ are the characteristic impedances for the balanced and unbalanced modes respectively, and $$\beta = \frac{2\pi}{\lambda}$$

The impedance looking into terminals C for equal loads on A and B is equal to $Z_C/2$. It is apparent that $Z_C$ will become large when $l = n\lambda/4$, where $n = 1, 3, 5, \ldots$, because of the $\tan^2 \beta l$ term in the numerator of (1). At frequencies corresponding to $l = n\lambda/4$, where $n = 1, 3, 5, \ldots$, the input impedance at C is high and it changes rapidly with frequency. Also it appears from Equation 1 that it is impossible to adjust the characteristic impedances to obtain a match over a wide frequency range. When $l = n\lambda/4$, $n = 0, 2, 4, \ldots$, the value of the reflection coefficient at C is ⅓ and the corresponding standing wave ratio is two to one.

The voltage induced in terminal D is proportional to $V_M$ given by Equation 2. Since there is a $\tan \beta l$ factor in Equation 2 the coupling to terminal D will be zero when $l = n\lambda/4$, where $n = 0, 2, 4, \ldots$.

The above considerations do not, of course, take into account discontinuity effects at the terminals where changes occur in cross-sectional shape and size.

Referring now to Fig. 5, wherein is shown the actual mechanical configuration and construction of the junction of the invention, the basic structural member is the outer shield, generally shown as 15, which is a cylindrical rectangular waveguide of square cross-section. For the terminals A, B, C, D and E, type N chassis connectors are used which have an inner conductor extending into the waveguide and an outer concentric conductor connected to the shield 15, the inner and outer conductors of the connectors being insulated from each other. Terminals A, B and C are located on one face of the rectangular shield 15 with equal center to center spacing. The conductor 20 connecting the inner conductors of terminals A, B and C is a piece of copper tubing soldered to the inner conductors of terminals A, B and C.

Outer conductors K and M are copper tubings concentrically fitted over inner conductor L with a dielectric 24 insulating conductor L from conductors K and M. The outer ends of conductors K and M are electrically connected to and mechanically supported by apertures 22 and 23 in plates 18 and 19, respectively, which plates seal the ends of rectangular waveguide 15. Plates 18 and 19 are mounted in waveguide 15 so that the inner surfaces are equidistant from the center $f$ of waveguide 15, the center of waveguide 15 being the axis of the inner conductor of terminal C. Conductors K and M are adjusted to have a gap $g$ located exactly opposite terminal C, and conductor L is soldered to the inner conductor of the connectors at terminals D and E, terminal E being adapted to have a shorting stub arrangement coupled thereto.

In one preferred constructional arrangement of the invention, the center-to-center spacing between terminals A, B and C was 6 inches; the plates 18 and 19 were mounted 6½ inches from the center of waveguide 15; and the gap at $g$ was adjusted at 1/16 inch. The waveguide 15 was a square brass tubing having inside dimensions of 0.940 x 0.940 inch. Sleeve conductors K and M were made from ¼ inch diameter copper tubing having an inside diameter of 0.125 inch. The inner conductor L was obtained by using the Teflon dielectric and inner conductor from a coaxitube.

While the dimensions of the construction described above proved satisfactory, the dimensions are not critical and it is to be understood that the invention is not limited to the above dimensions.

The scattering matrix may be used to describe completely the electrical characteristics of the junction, the representation of the scattering coefficient being straightforward and convenient. The number of scattering coefficients needed to describe the junction is reduced from sixteen to seven due to symmetry and reciprocity. Because of the construction, the transmission coefficient between terminals C and D is zero, leaving six coefficients which are $S_{AA}$ (=$S_{BB}$), $S_{CC}$, $S_{DD}$, $S_{AB}$, $S_{AC}$, $S_{AD}$.

By way of explanation, the scattering coefficient $S_{ij}$, where $i=j$, is simply the reflection coefficient at the $i$th terminal pair with matched loads on all other terminal pairs; and the scattering coefficient $S_{ij}$, where $i \neq j$, is the transmission coefficient between the $i$th and $j$th terminal pairs with matched loads connected to all terminal pairs.

The scattering coefficients $S_{AA}$, $S_{CC}$ and $S_{DD}$ are determined by first measuring the input admittance and then converting the data to reflection coefficients. The coefficients $S_{AB}$, $S_{AC}$ and $S_{AD}$ are calculated from the following equations:

(5) $$|S_{AC}| = \sqrt{\frac{1-|S_{CC}|^2}{2}}$$

(6) $$|S_{AD}| = \sqrt{\frac{1-|S_{DD}|^2}{2}}$$

(7) $$|S_{AB}| = \sqrt{1-(|S_{AA}|^2+|S_{AC}|^2+|S_{AD}|^2)}$$

These equations are based on an assumption that the junction is lossless. Direct measurements of $|S_{AD}|$ indicate that the calculated values are within 20 percent of the measured values.

Figure 7A:
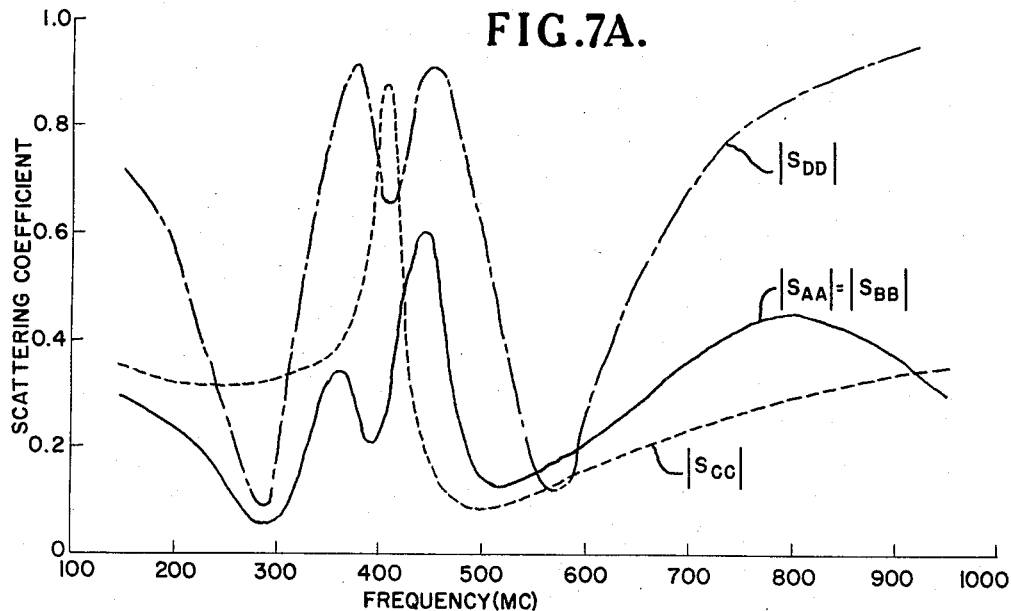
Figs. 7A, 7B and 8 are scattering coefficient characteristics of the invention.
Figure 7B:
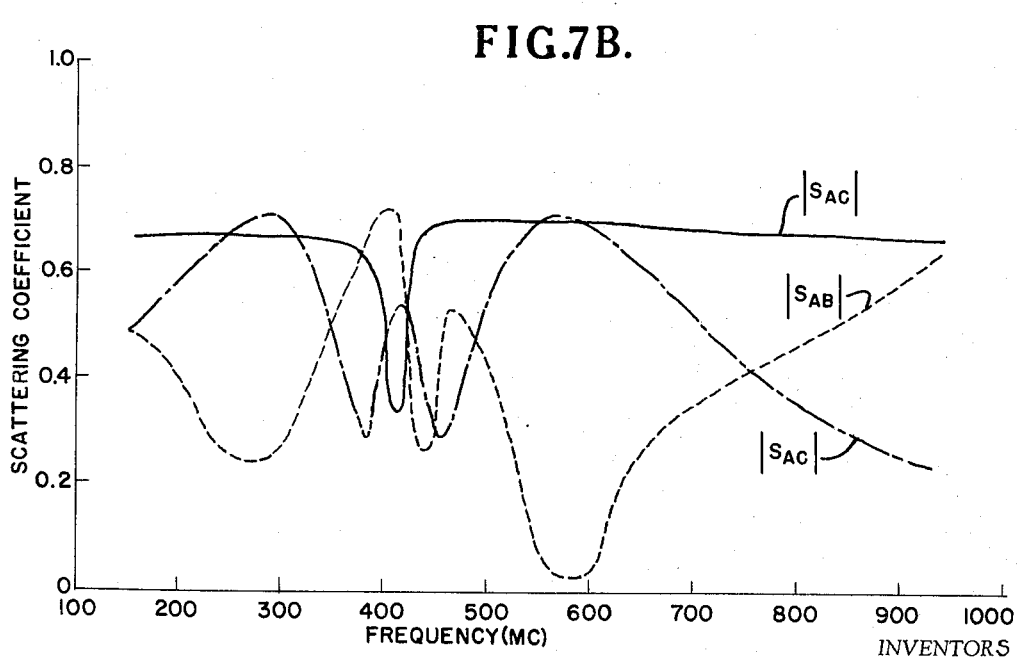
Figure 8:
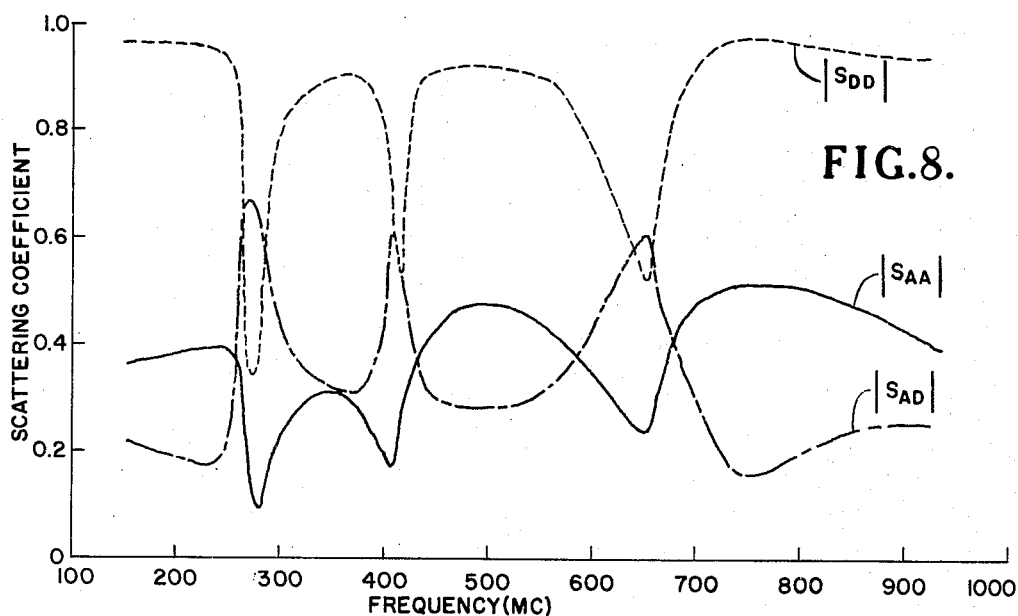

Figs. 7A and 7B contain plots of the magnitudes of the scattering coefficients which were measured with an adjustable shorting stub in series with terminal pair D. At each frequency, the short was adjusted for maximum $|S_{AD}|$. Figure 8 also contains plots of the magnitudes of the scattering coefficients except that a fixed short is placed in series with terminal pair D.

Figure 9:
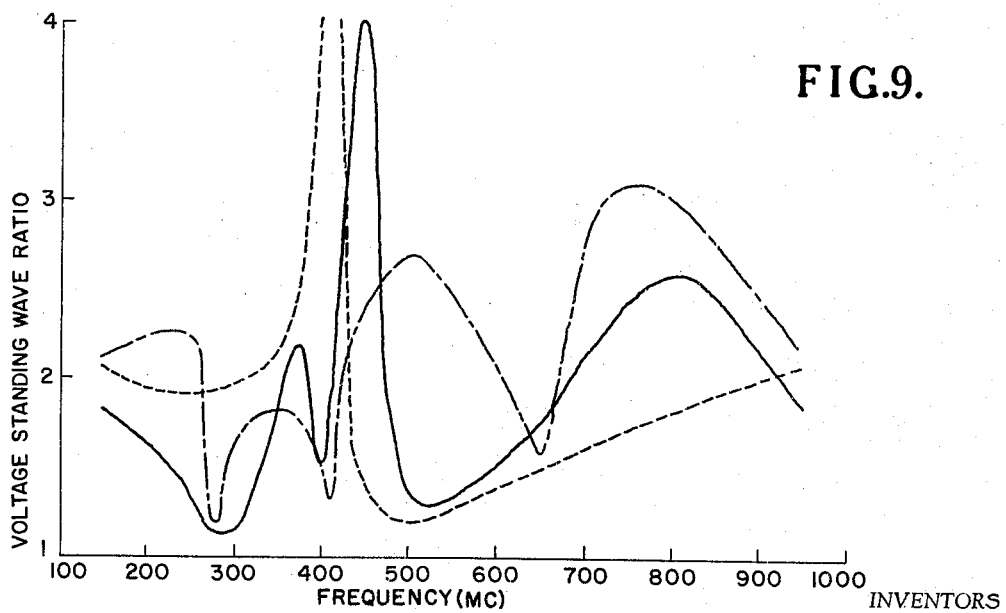
Fig. 9 illustrates the standing wave ratio characteristics of the invention.

The scattering coefficients $S_{CC}$ and $S_{AC}$ are the only ones not influenced by the position of the short in series with terminal pair D. The magnitude of $S_{CC}$, while not zero, is not unreasonably large except in the region of 410 mc. Even here it is not large enough to render the junction useless. In Fig. 9, it can be seen that the standing wave ratio corresponding to $S_{CC}$ is less than two to one except at frequencies near 410 mc.

The adjustable short in series with terminal D acts as a transformer of limited matching ability. However, an examination of Figs. 7A, 7B and 8 will show that a substantial improvement in the magnitudes of $S_{DD}$, $S_{AD}$, $S_{AA}$ and $S_{AB}$ results from tuning the short as compared to a fixed short. A completely effective transformer, such as a line stretcher followed by a shunting adjustable short would cause $|S_{DD}|$ and $|S_{AD}|$ to assume the ideal values of zero and 0.707, respectively. If a transformer were also added in series with terminal pair C to make $|S_{CC}|=0$, then all the scattering coefficients would have ideal values, which are $$S_{AA}=S_{CC}=S_{DD}=S_{AB}=0 \text{ and } |S_{AC}|=S_{AD}=0.707$$

While it may be noted from Figs. 7A, 7B and 8 that the magnitudes of the various scattering coefficients do not in general have ideal values, neither do the values go to the other extreme and render the junction useless at any frequency in the range from 100 to 1000 mc. By adding two transformers, one can always make the scattering coefficients assume the ideal values. Apparently, by fortuitous circumstance, the magnitude of the scattering coefficients do assume nearly ideal values in the frequency range from 550 to 600 mc. for the tuned case.

The hybrid junction of the instant invention is adaptable for utilization in many diverse circuit applications, some of which are illustrated in Figs. 10 to 13.

Referring now to Fig. 10, there is shown an antenna near field measurement arrangement employing the hybrid junction of the invention as a transmission coupling system, the terminals A, B, C, D and E in Fig. 10 corresponding to the terminal pairs A, B, C, D and E of Fig. 5. An antenna 30, whose near field is to be measured, is connected to one side of a variable phase shifter 32, the other side of phase shifter 32 being connected to terminal B of the hybrid junction, shown generally as 15. Associated with phase shifter 32 is a shorting stub 38 which functions in conjunction with phase shifter 32 to form an adjustable impedance transformer. A signal generator 35 is connected through an isolating attenuator 34 to terminal C; a load impedance 36 is connected to terminal A; and a shorting stub 33 is connected to terminal E. A field intensity meter or calibration receiver is connected to terminal D for measuring the near field data of antenna 30 for different positions of reflecting dipole probe 31 with respect to antenna 30.

Figure 11:
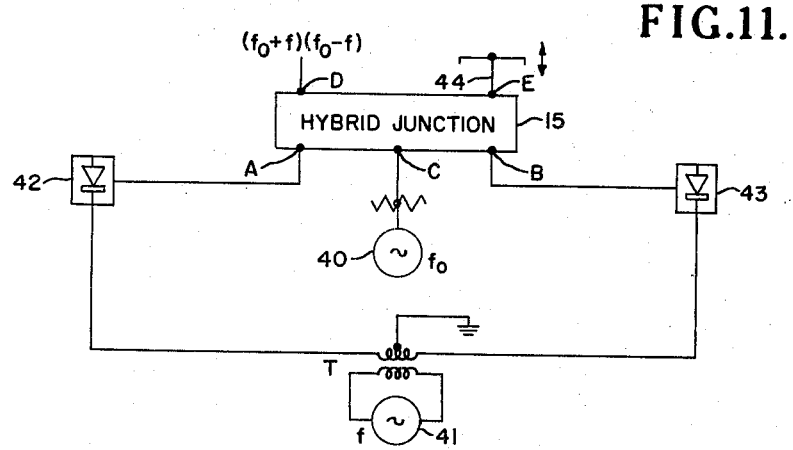

Fig. 11 illustrates a suppressed carrier balanced modulator system wherein a carrier frequency signal $f_0$, applied from generator 40 to terminal C, is modulated by an intelligence signal $f$ from generator 41 which applies signal $f$ through transformer T to a pair of rectifiers 42 and 43 connected to terminals A and B, respectively, with a shorting stub 44 being provided at terminal E. The output is taken from terminal D for application to a utilization device.

Figure 12:
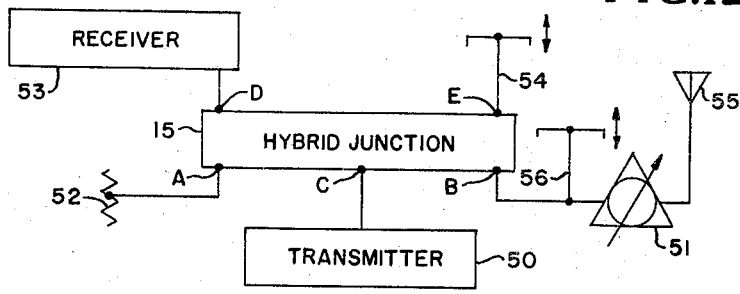

In Fig. 12 is shown an antenna duplexer arrangement utilizing the hybrid junction of the invention. A transmitter 50 applies the signal to be transmitted to terminal C of junction 15 wherein the signal is translated to terminal B which is connected to one side of a variable phase shifter 51, the other side thereof being connected to antenna 55. A shorting stub 56 forms an adjustable impedance transformer with phase shifter 51. A load 52 and a shorting stub 54 are connected respectively to terminals A and E. The signal received by antenna 55 passes through junction 15 and is applied through terminal D to receiver 53.

Figure 13:
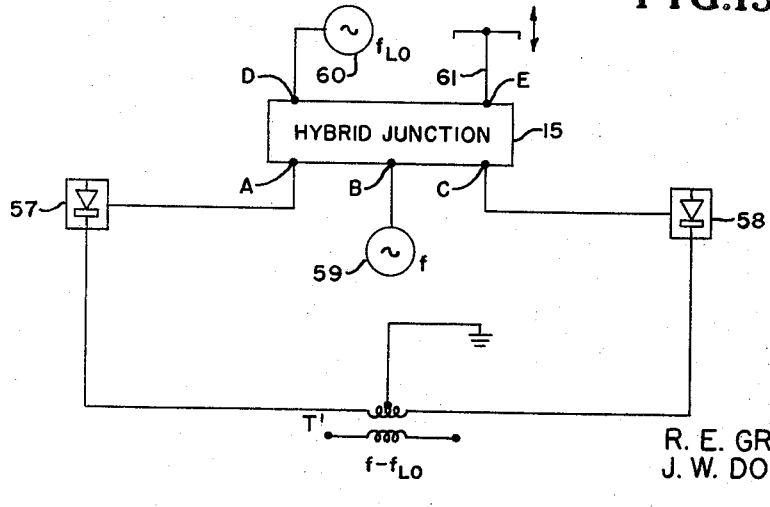

Fig. 13 is a balanced mixer circuit in which the hybrid junction of the invention is employed to isolate the local oscillator from the incoming signal source. The local oscillator 60 applies the heterodyning signal $f_{LO}$ to the junction 15 through terminal D, and a signal source 59 applies the incoming signal $f$ to the junction through terminal B. A pair of rectifiers 57 and 58 are connected respectively to terminals A and B to derive the beat frequency $(f-_{LO})$ which is taken off the secondary winding of transformer T' whose primary has it ends connected to rectifiers 57 and 58.

From the foregoing, it is seen that the invention provides a new and improved hybrid junction which has extensive utility in many diversified applications and which has a broader frequency band than heretofore obtained, the hybrid property in the invention being obtained by means of mechanical configuration rather than by means of electrical lengths of lines as previously obtained in the conventional hybrid ring.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A wave transmission coupling system for use at very high frequencies and ultra high frequencies, means forming a hybrid junction comprising, a plurality of mutually-spaced, open-ended coaxial lines having a common inner conductor and each having an outer conductor, a portion of at least one of said outer conductors extending into a conductive shield, a coupling conductor substantially longitudinally coextensive with said coaxial lines and disposed to electromagnetically couple said coaxial lines, a plurality of transmission lines connected to said coupling conductor at discrete points along its length, and said conductive shield enclosing within the confines thereof both said coaxial lines and said coupling conductor.

2. In a circuit coupling network, a closed cylindrical wave guide having an aperture at each end thereof, means forming a hybrid junction comprising, a pair of transmission lines longitudinally coextensive with said wave guide and housed therewithin, said transmission lines comprising a continuous central conductor and a pair of axially spaced outer conductors coaxial therewith and separated therefrom by a dielectric, said outer conductors extending into said apertures, an elongated cylindrical conductor substantially coextensive with said transmission lines and electromagnetically coupled therewith, and a plurality of conductive members electrically connected to said cylindrical conductor at discrete points along its length and insulatably mounted on said wave guide.

3. The apparatus of claim 2, wherein a pair of terminals are formed by said central conductor and the wave guide at each of said apertures, and wherein each of said conductive members with said wave guide forms a pair of terminals.

4. The apparatus of claim 3, further including adjustable means disposed externally of said wave guide and in electrical conductive relation with one of said pair of terminals to connect said central conductor to one of said outer conductors.

5. A circuit coupling device for use at very high frequencies and ultra high frequencies, comprising a pair of like hollow conductive members disposed in axial alignment and mutually spaced, a central conductor arranged in the hollow members to form therewith a pair of concentric transmission lines, means forming a hybrid junction comprising a portion of at least one of said hollow conductive members extending into a conductive shield, said central conductor forming a pair of terminals with said shield at each of said outer ends, a cylindrical conductive element substantially coextensive with said pair of members and having its longitudinal axis parallel with the axis of said members, and an odd number of conductors connected to said element at longitudinally equidistant points along the length thereof and insulatably supported by said means, the center one of said odd number of conductors being connected to said element at a point opposite the spacing between said conductive members and each one of said odd number of conductors forming a pair of terminals with said means at its respective point of support by said means.

6. The device as claimed in claim 5, further including tuning means connecting said central conductor to one of said hollow members.

7. The apparatus of claim 5, wherein said conductive shield is a cylindrical wave guide enclosing said transmission lines and said conductive element.

References Cited in the file of this patent

UNITED STATES PATENTS

| | | |
|---|---|---|
| 2,445,895 | Tyrrell | July 27, 1948 |
| 2,454,907 | Brown | Nov. 30, 1948 |
| 2,575,571 | Wheeler | Nov. 20, 1951 |
| 2,583,773 | Hiehle | Jan. 29, 1952 |
| 2,702,366 | Ginzton | Feb. 15, 1955 |
| 2,716,219 | Bell | Aug. 23, 1955 |
| 2,792,550 | Backstrand | May 14, 1957 |